(12) United States Patent
Ottnad et al.

(10) Patent No.: US 12,504,740 B2
(45) Date of Patent: Dec. 23, 2025

(54) METHOD AND APPARATUS FOR DETERMINING CUTTING PARAMETERS FOR A LASER CUTTING MACHINE

(71) Applicant: TRUMPF Werkzeugmaschinen SE + Co. KG, Ditzingen (DE)

(72) Inventors: Jens Ottnad, Karlsruhe (DE); Leonie Felica Tatzel, Korntal (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 263 days.

(21) Appl. No.: 17/844,932

(22) Filed: Jun. 21, 2022

(65) Prior Publication Data

US 2022/0317663 A1 Oct. 6, 2022

Related U.S. Application Data

(63) Continuation of application No. PCT/EP2020/087092, filed on Dec. 18, 2020.

(30) Foreign Application Priority Data

Dec. 20, 2019 (DE) .................... 10 2019 220 478.3

(51) Int. Cl.
*G05B 19/41* (2006.01)
*G05B 19/4155* (2006.01)
(52) U.S. Cl.
CPC .......... *G05B 19/4155* (2013.01); *G05B 2219/45041* (2013.01)
(58) Field of Classification Search
USPC ......................................................... 700/166
See application file for complete search history.

(56) References Cited

U.S. PATENT DOCUMENTS 6,345,205 B1   2/2002  Inamasu et al.
9,529,343 B2  12/2016  Bauer et al.
(Continued)

FOREIGN PATENT DOCUMENTS

CN      102855326 A    1/2013
DE       69825282 T2   8/2005
(Continued)

OTHER PUBLICATIONS

CN-102855326-A (Year: 2013).*
(Continued)

*Primary Examiner* — Hien D Khuu
(74) *Attorney, Agent, or Firm* — Laurence A. Greenberg; Werner H. Stemer; Ralph E. Locher

(57) ABSTRACT

A method for determining cutting parameters for a laser cutting machine includes the following steps: Receiving at least one machine parameter, at least one process parameter and/or at least one material parameter; outputting properties that can be influenced by the cutting parameters, of a laser-cut edge to be cut by the laser cutting machine; receiving a weighting of the properties; and determining the cutting parameters using the at least one machine parameter, the at least one process parameter, and/or the at least one material parameter and also using the weighted properties. There is also described an apparatus for carrying out the method, in particular an apparatus for machining a workpiece and/or an apparatus which is designed to simulate a production process.

1 Claim, 3 Drawing Sheets

(56) References Cited

U.S. PATENT DOCUMENTS

| | | | |
|---|---|---|---|
| 9,839,975 B2 | 12/2017 | Beutler | |
| 10,987,775 B2 | 4/2021 | Nishikawa et al. | |
| 10,990,078 B2 | 4/2021 | Kreidler | |
| 2003/0192865 A1* | 10/2003 | Cole, III | B23K 26/211 700/166 |
| 2003/0204283 A1* | 10/2003 | Picard | B23K 26/032 700/166 |
| 2009/0240368 A1* | 9/2009 | Young, Jr. | B23K 31/10 219/69.1 |
| 2011/0284511 A1* | 11/2011 | Boynton | B23K 26/26 219/121.72 |
| 2015/0073583 A1 | 3/2015 | Karl et al. | |
| 2015/0205289 A1* | 7/2015 | Henning | F16M 11/18 700/98 |
| 2020/0246920 A1* | 8/2020 | Nakagawa | B23Q 17/10 |
| 2020/0293021 A1 | 9/2020 | Goya et al. | |

FOREIGN PATENT DOCUMENTS

| | | | |
|---|---|---|---|
| DE | 112015004920 T5 | 7/2017 | |
| DE | 112018005809 T5 | 8/2020 | |
| EP | 2883647 A1 | 6/2015 | |
| EP | 3454146 A1 | 3/2019 | |
| JP | H04138504 A | 5/1992 | |
| JP | H11143516 A | 5/1999 | |
| JP | 2017215675 A | 12/2017 | |
| JP | 2019101680 A | 6/2019 | |
| RU | 2548545 C2 * | 4/2015 | ......... B23K 26/702 |
| WO | 2012000995 A1 | 1/2012 | |
| WO | WO-2018030939 A1 * | 2/2018 | ......... G05B 13/0245 |

OTHER PUBLICATIONS

Omar De Mitri et al.: "Image Acquisition, evaluation and segmentation of thermal cutting edges using a mobile device", Proc. SPIE 11059, Multimodal Sensing: Technologies and Applications, Jun. 21, 2019 (Jun. 21, 2019) doi: 10.1117/12.2527993.

Liang-Chieh Chen et al.: "Encoder-Decoder with Atrous Separable Convolution for Semantic Image Segmentation" arXiv:1802.02611v3 [cs.CV], Aug. 22, 2018, (Aug. 22, 2018), https://arxiv.org/abs/1802.02611v3.

Kanjar De et al.: "Image Sharpness Measure for Blurred Images in Frequency Domain", Science Direct, International Conference on Design and Manufacturing, IConDM 2013, Procedia Engeneering 64 (2013) pp. 149-158.

J. Stahl et al.: "Quick roughness evaluation of cut edges using a convolutional neural network", Proc. SPIE 11172, Fourteenth International Conference on Quality Control by Artificial Vision, 111720P,Jul. 16, 2019, (Jul. 16, 2019) https://doi.org/10.1117/12.2519440.

* cited by examiner ered. Therefore, the weighting is advantageous in order to be able to precisely identify how important the properties are in terms of their relationship with one another. The receiving in step C) can be done for example by an operator via an input unit. The input unit is preferably coupled to the output unit via which the properties were output in step B). In one embodiment, the receiving in step C) can also be effected via a data interface.
METHOD AND APPARATUS FOR DETERMINING CUTTING PARAMETERS FOR A LASER CUTTING MACHINE

CROSS-REFERENCE TO RELATED APPLICATION

This application is a continuation, under 35 U.S.C. § 120, of copending International Patent Application PCT/EP2020/087092, filed Dec. 18, 2020, which designated the United States; this application also claims the priority, under 35 U.S.C. § 119, of German Patent Application 10 2019 220 478.3, filed Dec. 20, 2019; the prior applications are herewith incorporated by reference in their entirety.

FIELD AND BACKGROUND OF THE INVENTION

The invention relates to a method for determining cutting parameters for a laser cutting machine and to an apparatus for carrying out the method, in particular an apparatus for machining a workpiece and/or an apparatus designed to simulate a production process.

Laser cutting machines are preferably used for quickly producing and machining precise workpieces. In this context, the workpiece is conventionally cut from a plate, in particular in the form of a metal sheet, using a laser. Depending on the method, the energy introduced by the laser results in the melting, combustion or sublimation of the workpiece material in the kerf. The ablated material is removed from the kerf in particular with the aid of a process gas.

The resulting cut edge has a surface with characteristic features which also depend on the method sequence or the method parameters, such as cutting speed or the nozzle-metal sheet distance, for example. Depending on the process and field of application of the workpieces produced, a certain surface finish of the cut edge is sought.

Commonly assigned international patent application WO 2012/000995 A1 describes a dialog system for examining a machining process carried out on a machine tool. A proposal is determined for improving at least one quality feature of a subsequent machining process. An operator can predetermine, via input means, the quality feature to be improved. Stored expert knowledge is used to determine the proposal for improving the quality feature. To determine the proposal, data determined by the machine tool sensor system and/or photographs of a machined workpiece together with associated material and machining data are also read in.

SUMMARY OF THE INVENTION

It is accordingly an object of the invention to provide a method and device for determining cutting parameters for a laser cutting machine which overcome the above-mentioned disadvantages of the heretofore-known devices and methods of this general type and which provide for an improved method and device that, inter alia, further simplify the ease of operation.

With the above and other objects in view there is provided, in accordance with the invention, a method of determining cutting parameters for a laser cutting machine, the method comprising the following steps:
A) receiving at least one machine parameter, at least one process parameter and/or at least one material parameter;
B) outputting properties, that can be influenced by the cutting parameters, of a laser-cut edge able to be cut by the laser cutting machine;
C) receiving a weighting of the properties;
D) determining the cutting parameters using the at least one machine parameter, the at least one process parameter and/or the at least one material parameter and also using the weighted properties.

The method thus includes, in step A), the receiving of at least one machine parameter, at least one process parameter, and/or at least one material parameter. In this respect, machine parameters specify which laser cutting machine is used. Process parameters specify which laser cutting process is used. Material parameters specify which material should be cut, that is to say of which material, say, the metal sheet to be cut consists. Receiving in step A) can be done for example by an operator input via an input unit. It is likewise possible that the receiving in step A) is effected via a data interface.

The method includes, in step B), the output of properties, that can be influenced by the cutting parameters, of a laser-cut edge that can be cut by the laser cutting machine. The properties, that can be influenced by the cutting parameters, of the laser-cut edge include, e.g., the features of the cut edge itself and the features of the process used to create the cut edge. Features of the cut edge, by way of example, are burr, burr height, burr thickness, edge inclination, roughness, discoloration, homogeneity. Features of the process are e.g. the robustness, which is also referred to as process reliability and may indicate the risk of a faulty cut. Further features of the process may be the productivity of the process and/or of the gas consumption. The properties may be output for example to an operator via an output unit. The outputting of the properties in step B) may likewise be done via a data interface.

The cutting parameters of the laser cutting on the laser cutting machine are, for example, advancement rate, nozzle-metal sheet distance, setting dimension, gas pressure, focus diameter, laser power output, nozzle diameter, gas type.

In a step C), a weighting of the properties is received. In this respect, the properties are the properties of the laser-cut edge that are able to be influenced by the cutting parameters. Here, the properties comprise the features of the cut edge and also the features of the process. The weighting of the properties specifies how important a property is in relation to the other properties. Not all properties can be optimized at the same time; in some cases, the requirements placed on the cutting parameters for various properties are different or even contradict one another. Therefore, the weighting is advantageous in order to be able to precisely identify how important the properties are in terms of their relationship with one another. The receiving in step C) can be done for example by an operator via an input unit. The input unit is preferably coupled to the output unit via which the properties were output in step B). In one embodiment, the receiving in step C) can also be effected via a data interface.

In a step D), the cutting parameters are determined using the at least one machine parameter, the at least one process parameter and/or the at least one material parameter and also using the weighted properties. The cutting parameters are determined for example by a weighted optimization of multiple target functions. The target functions are properties that can be influenced by the cutting parameters, of a laser-cut edge able to be cut by the laser cutting machine. The parameters to be optimized are the cutting parameters. The resolution is effected, for example, by at least one data aggregation routine, which is based on known data sets.

The data aggregation routine may be designed to aggregate one or more known data sets, what are referred to as input data sets, to form a new data set, the output data set. The output data set may comprise one or more numbers or vectors. All or part of the output data set may be made available to further data aggregation routines in the form of an input data set. The determination of the cutting parameters is particularly preferably done in the form of an algorithm with multiple linked data aggregation routines. In particular, several hundred, preferably several thousand, such data aggregation routines may be linked to one another. This significantly improves the quality and speed. One or more data aggregation routines, particularly preferably all the data aggregation routines may be configured to combine multiple output data in each case with the weightings of the properties, and therefore to aggregate them to form a new data set. Data sets belonging to different weightings of the properties may likewise be aggregated. In embodiments of the invention, the at least one data aggregation routine can be changed and/or the combinations of the data aggregation routines can be changed. A data aggregation routine may be for example a neural network or a machine learning algorithm, such as an evolutionary algorithm, for example.

In accordance with a particularly preferred aspect of the invention, preference is given to a method in which the features of the cut edge include one and/or more of the following cut edge quality features:
  Roughness intensity
  Roughness shape
  Burr height
  Burr shape
  Inclination of cut edge
  Discoloration
  Truncated cut top edge
  Pitting, individual pitting, buildup of pitting, self burning
  Hollow profile of the cut surface
  Edge melting at the cut top edge/cut bottom edge
  Edge cavity cut above the cut bottom edge/below the cut top edge
  Local groove deviation
  Cracks in the cut surface
  Chain of melt beads on the cut top edge
  Ends of the cut surface not cut through
  Deviation of the cutting angle on both cut surfaces
  Deviation of the cutting angle on one cut surface
  Uneven groove depth
  Corrugated profile of the cut surface
  Excessive groove drag
  Widening of the kerf at the workpiece top side/top edge, workpiece bottom side/bottom edge
  Excessive groove depth, extensive roughening
  Cut surface undulating in the cutting direction
  Undulating start of the cut
  Slag adhesion on bottom side
  Slag crust, welding together of the cut edges, bead, shearing melt
  Burr formation, burr bead, fine acicular burr, noticeable burr, long burr that can be broken off, short burr that cannot be broken off, very extensive burr
  Interrupted cut in longitudinal direction, beam decay
  Spatters on material surface, filament formation
  Discoloration of the cut surface, discoloration of cut ends, discoloration of cut surfaces, discoloration of corners, smoke residues In accordance with an added feature of the invention, the cutting parameters are preferably determined by a computing unit. In one embodiment of the invention, the receiving of machine, material and process parameters, the outputting of the properties and/or the receiving of the weighting of the properties is done via an input/output unit coupled to the computing unit. It is likewise possible that the receiving of machine, material and process parameters, the outputting of the properties and/or the receiving of the weighting of the properties is done via a data interface of the computing unit. In this case, the data received can have been determined in advance by a further computing unit, for example, and/or the data output can be processed by the further computing unit and/or a second further computing unit. This can be used for factory simulations, for example.

In one embodiment, at least one of the cutting parameters determined in step D) can be output in a step E1. The outputting can be done to an operator, for example on the outputting unit on which the outputting in step B) is done. It is likewise possible to perform outputting to the operator and/or a further operator via a further outputting unit. It is likewise possible that the outputting in step E1 is done via a data interface.

In a preferred embodiment, in step E1 all determined cutting parameters are output, i.e., transmitted, to the laser cutting machine. In one embodiment, the laser cutting process is then carried out using the transmitted cutting parameters. Optionally, after this the cutting result can be transmitted back, e.g. by means of an optical image, and made available for the data aggregation routine in the form of an input data set.

In one embodiment, information about at least one of the properties is output in a step E2. This may concern on the one hand the outputting of the input just performed in the form of feedback to a possible operator. This can moreover concern the outputting of information about the weighting of the properties just input in conjunction with further properties. This is advantageous in order to output the effect of the weightings input on the other properties when weightings are being input in step C). Thus, for example, the way in which the properties, that is to say e.g. the features of the cut edge itself and the features of the process, change as a result of changing the weighting factor can be output. The outputting can be done for example on the output unit used in step B) and/or E1.

In one embodiment, the receiving in steps A) and/or C) is done via a graphical user interface. In this context, the graphical user interface may be arranged on the input unit or connected to the input unit via a data line. The input unit may at the same time be part of the computing unit. The receiving may comprise the receiving of an operator input. For the receiving in step A), it is possible to display for example input fields, which are assigned to the parameters, such as the at least one machine parameter, the at least one process parameter and/or the at least one material parameter. An input into the input fields makes it possible to then receive the parameters. The graphical user interface may further be configured such that it displays optical images of slide controls, each of which corresponds to a property that can be influenced by the cutting parameters. By adjusting the displayed slide control by means of e.g. a pointer instrument or via a touch-sensitive screen, it is then possible to set the weighting of the properties—step C).

In one embodiment, the outputting in steps B), E1 and/or E2 is done via a graphical user interface, which may correspond to the graphical user interface intended for receiving in steps A) and/or C). In this context, the graphical user interface may be arranged on the output unit, be connected to the output unit via a data line, and/or be part of the input/output unit. It is possible for the output unit and/or the input/output unit to be part of the computing unit at the same time. For the outputting in step E2, for example, in order to output the effect of the weightings input on the other properties to the weightings input in step C). Thus, for example, the way in which the properties, that is to say e.g. the features of the cut edge itself and the features of the process, change as a result of changing the weighting factor can be output. Numerical values and/or further visual displays, for example in color and/or in arrow form, can be displayed, which make it clear what properties—for example in comparison with the previous input—are improved and/or adversely affected.

In one embodiment, in a step F a graphical representation of the laser-cut edge is output, which is connected with the use of the at least one machine parameter, the at least one process parameter and/or the at least one material parameter and also to the cutting parameters. This makes it possible to provide optical feedback to an operator as to the appearance of the laser-cut edge to be expected under the selected weightings.

In one embodiment, in step F, for example a photograph of a laser-cut edge is displayed, which is stored together with its parameters—machine parameters, process parameters, material parameters, cutting parameters—in a memory. For the displaying in step F, then that photograph is selected that has the parameters closest to the current parameters. The memory may, for example, be located in the computing unit or at a remote location connected via a data line.

In a further embodiment, the graphical representation of the laser-cut edge displayed in step F is determined using a data aggregation routine, with the at least one machine parameter, the at least one process parameter and/or the at least one material parameter and also the cutting parameters being used as input into the data aggregation routine. The data aggregation routine is used to generate the graphical representation of the laser-cut edge to be expected.

An apparatus for machining a workpiece on a laser cutting machine, which apparatus is suitable for carrying out the method for determining cutting parameters for the laser cutting machine, has a graphical user interface set up to receive at least one machine parameter, at least one process parameter and/or at least one material parameter. The graphical user interface is also set up to output properties of a laser-cut edge able to be cut by a laser cutting machine, with the properties being able to be influenced by cutting parameters. The graphical user interface is also set up to receive a weighting of these properties. The graphical user interface is preferably part of an input/output unit. The apparatus for machining a workpiece moreover has a computing unit set up to determine the cutting parameters using the at least one machine parameter, the at least one process parameter and/or the at least one material parameter and also using the weighted properties. By outputting the machine parameters, the process parameters and/or the material parameters and receiving the weighting thereof, the apparatus provides the option of determining those cutting parameters that give a result coming closest to the requirements of an operator of the apparatus. This makes it easier for an operator to set the apparatus.

In one embodiment, the apparatus for machining the workpiece includes a laser cutting machine, which is configured to cut the workpiece by means of a laser cut using the cutting parameters. This embodiment makes it possible to transfer the cutting parameters determined to the laser cutting machine, whereupon it can carry out the cutting process using the parameters determined.

In one embodiment, the graphical user interface is also configured to output at least one of the cutting parameters determined and/or to output information about at least one of the properties. In this way, it is possible for a user to estimate the effect of their inputs and to assess possible results.

In one embodiment, an apparatus for carrying out the method according to the invention is designed to simulate a production process, the simulated production process comprising the laser cutting machine on which a laser cutting process can be carried out using the cutting parameters determined. This embodiment is especially advantageous in a factory simulation, in which different parameters for different machine tools in the factory can be combined in one simulation. This can be utilized for example to optimize parameters over multiple machine tools of a factory or of a factory network. An optimization can be made, for example, as to whether it is expedient to deburr the cut edge after the cutting operation in a separate deburring process, or whether it is expedient to cut the cut edge with burrs which are as small as possible by means of the laser.

Other features which are considered as characteristic for the invention are set forth in the appended claims. The features mentioned above and those that will be explained still further can be used in each case individually by themselves or as a plurality in any desired combinations. The embodiments shown and described should not be understood as an exhaustive enumeration, but rather are of illustrative character for outlining the invention.

Although the invention is illustrated and described herein as embodied in a method and device for determining cutting parameters for a laser cutting machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
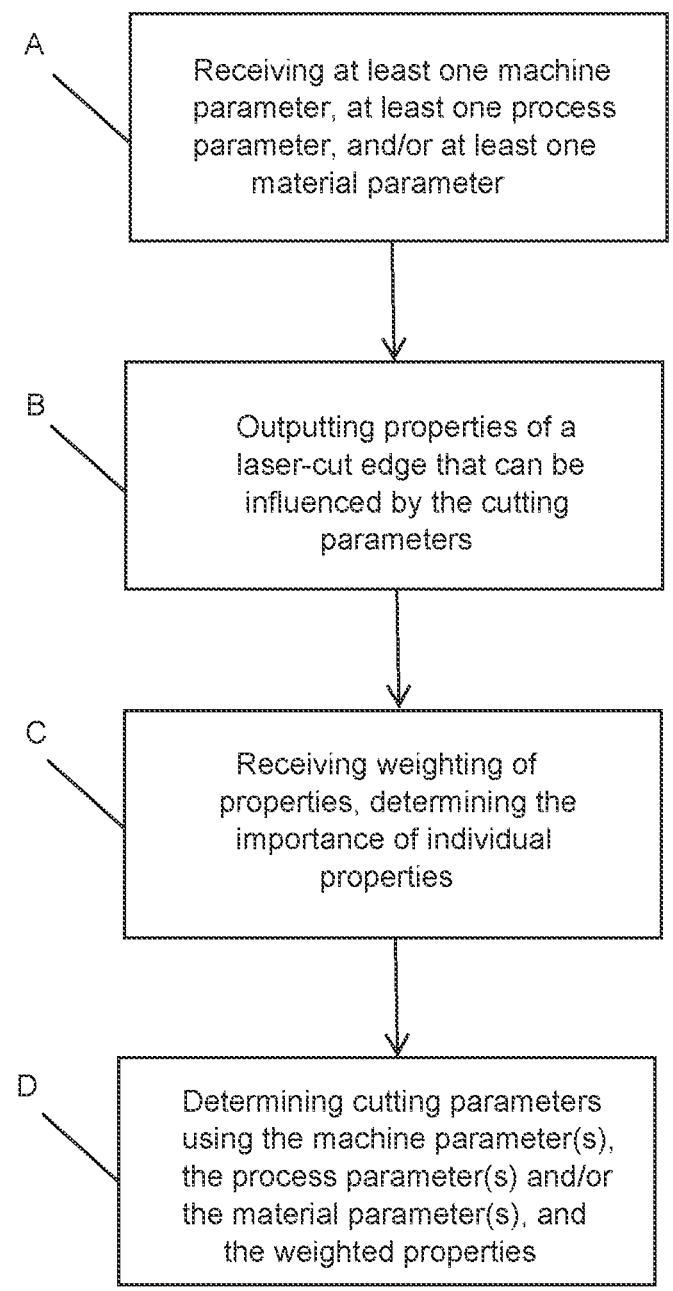
FIG. 1 schematically shows a flow diagram of the method according to the invention.

Referring now to the figures of the drawing in detail and first, in particular, to FIG. 1 thereof, there is shown a flowchart pertaining to the method according to the invention. In step A, at least one machine parameter, at least one process parameter, and/or at least one material parameter is received. This may be effected, for example, by an operator's selection specifying the process, the material and the machine, etc. for which the cutting parameters should be optimized. In a step B), properties, that can be influenced by the cutting parameters, of a laser-cut edge able to be cut by the laser cutting machine 18 are output. In a step C), a weighting of the properties is received. The receiving is preferably done by an operator input relating to the properties output in step B). Depending on how the weighting changes, the importance of the individual properties change.

If the same weighting were input for each property, all of the properties would have the same importance. In a step D), the cutting parameters are determined using the at least one machine parameter, the at least one process parameter and/or the at least one material parameter and also using the weighted properties. A property with a larger weighting is assigned higher importance in the determination here. If, for example, all properties have the same weighting, they have the same importance in the determination of the cutting parameters, as already mentioned.

The method may run for example on a computing unit 14 (FIG. 2), into which, via an input/output unit, the parameters and weightings are input as operator preferences, to be received by the computing unit 14. Taking the inputs as a starting point, the "optimum" cutting parameters are determined and output. In addition, there is a visual indication that the change to a parameter and/or to a weighting limits the options at other points and the approximate cut edge to be expected is displayed.

This assists an operator in obtaining precisely the cutting edge that best meets their requirements during the laser cutting operation. The operator likewise gains the option of changing the settings relating to the cutting parameters themselves and in the process is assisted by the method and/or the apparatus in determining a complete set of cutting parameters which produces a cutting result coming closest to the desired laser-cut edge.

Figure 2:
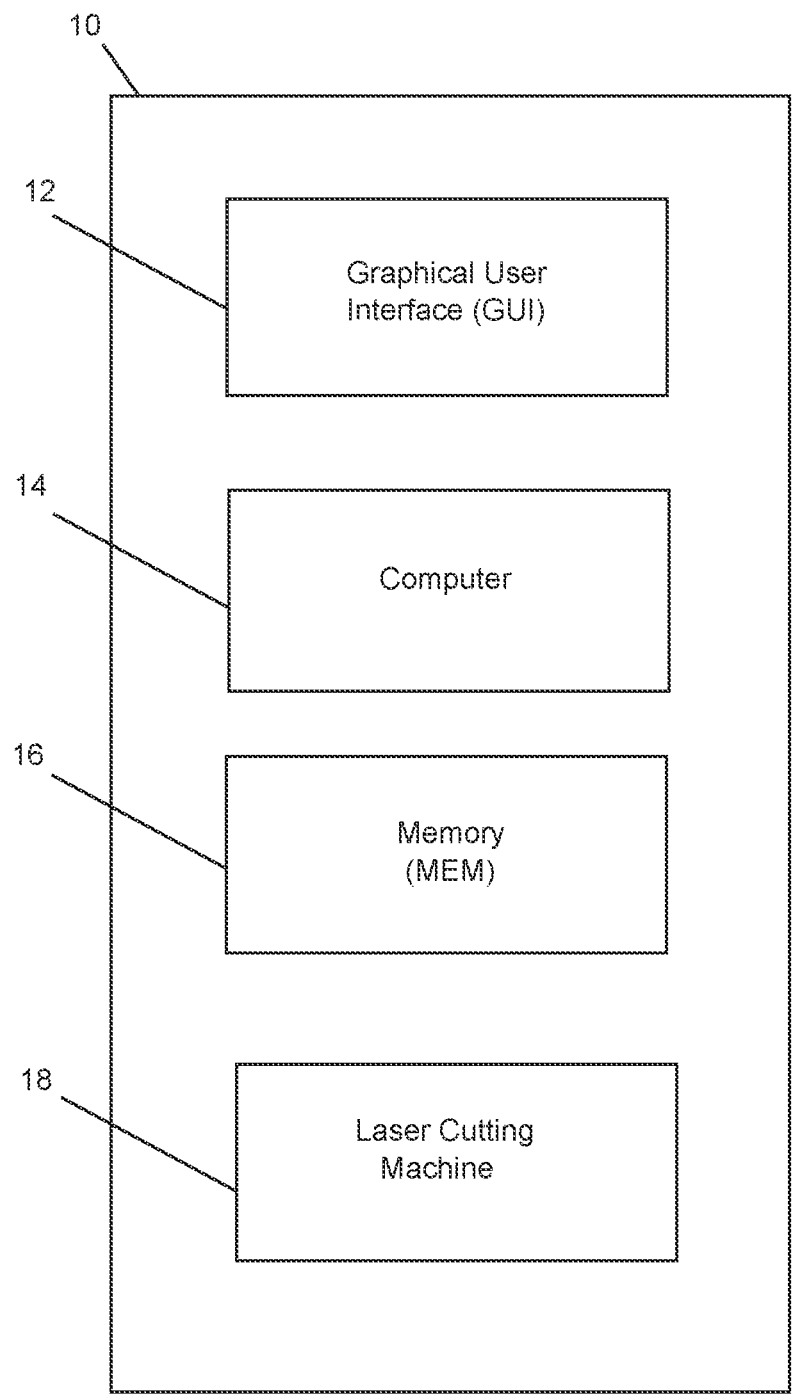
FIG. 2 schematically shows an apparatus for machining a workpiece.

FIG. 2 schematically illustrates an apparatus 10 for machining a workpiece. The apparatus 10 has a graphical user interface (GUI) 12 which may for example be part of an input/output unit. The graphical user interface 12 is set up to carry out at least steps A), B), C) of the method of FIG. 1, that is to say to receive at least one machine parameter, at least one process parameter and/or at least one material parameter, to output properties of a laser-cut edge able to be cut by a laser cutting machine, with the properties being able to be influenced by cutting parameters, and to receive a weighting of the properties. The apparatus 10 moreover has the computing unit 14 set up to determine the cutting parameters using the at least one machine parameter, the at least one process parameter and/or the at least one material parameter and also using the weighted properties. The program code for carrying out the method, for example, can be stored in a memory 16 of the apparatus 10. A laser cutting machine 18 is designed to cut the workpiece by means of a laser beam, i.e., to carry out a laser cutting method using the cutting parameters determined. For this, the cutting parameters determined in the computing unit 14 can be output to the laser cutting machine 18.

Figure 3:
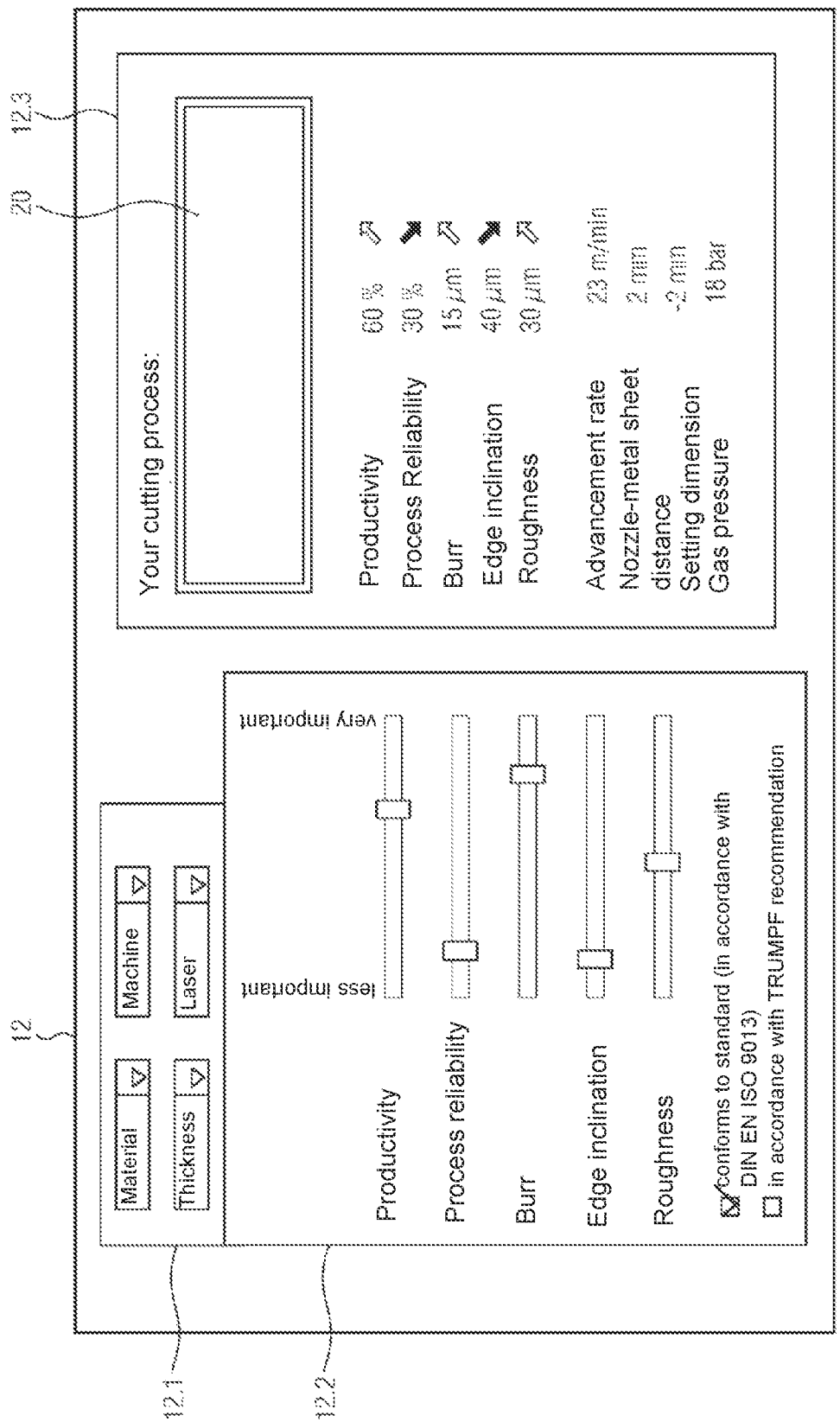
FIG. 3 shows an example of a graphical user interface.

FIG. 3 illustrates a graphical user interface 12 by way of example, as can be used in an apparatus 10 according to FIG. 2.

Graphical user elements allowing an operator to input material parameters, machine parameters and process parameters are arranged in a first area 12.1 (field 12.1) of the surface 12. In the example illustrated, the material parameters "material"—material to be cut of the workpiece—and "thickness"—thickness of the workpiece—can be specified. Stainless steel, construction steel, aluminum or copper or combinations thereof can be used as materials, for example. The thickness of the workpiece can—depending on the material—be from under 1 millimeter (mm) to several centimeters (cm). Moreover, "machine," that is to say the type of laser cutting machine 18 used, can be specified. Examples of laser cutting machines 18 that can be used are commercially available under the names Trumpf TruLaser® 5030 and Trumpf TruLaser® Center 7030. Depending on the laser cutting machine, the optical systems used and the like, for example, may be different. Furthermore, "laser" can specify the type of laser used. Examples for laser specifications are disk lasers, CO2 lasers, each having the possible specification of maximum laser power output.

In a second area 12.2 (field 12.2), properties, that can be influenced by the cutting parameters, of the laser-cut edge able to be cut by the laser cutting machine 18 can be output and provided with a weighting. For this purpose, the properties are output for example with their names, in this instance for example "productivity," "process reliability," "burr," "edge inclination," "roughness." A slide control, via which the weighting of the property can be set in comparison with the other properties from the second area 12.2, is preferably displayed next to each property. In this case, one end of the slider, e.g., the left-hand end, means "less important," and the opposite end, e.g., the right-hand end, of the slider means "very important." Further conditions that "bundle" multiple properties together can also be set in the second area 12.2. An example for this is the desire for a cut edge in accordance with the standard DIN EN ISO 9013, which provides maximum values for roughness and edge inclination. In the example illustrated in FIG. 3, this condition is selected by a check mark. One condition that can be selected in the example illustrated is that a cut should be made in accordance with a recommendation from the manufacturer of the machine tool. This recommendation comprises a set of cutting parameters, using which the cut is to be made, for each material, each thickness, each machine etc. This set of parameters is thus not entirely determined individually, but comprises a set of generally valid parameters, which e.g. touches on empirical knowledge.

In a third area 12.3 (field 12.3), the cutting parameters determined are output at the bottom. In the example illustrated, in this instance the values for "advancement rate," "nozzle-metal sheet distance," "setting dimension" and "gas pressure" are output. The values that should be assumed by the cutting parameters are advantageously restricted by additional conditions in order that the cutting process itself can still be carried out. For example, the nozzle-metal sheet distance should not be set as so small that collisions occur between the laser cutting head and the workpiece.

Above this—in the center area of 12.3—properties of the laser-cut edge that are to be expected are illustrated. In the example illustrated, these properties include the features of the cut edge itself, in this instance "burr," "edge inclination" and "roughness." The properties moreover include the features of the process by which the cut edge was created, in this instance: "productivity," "process reliability." A graphical indication of the quality of the property is displayed next to the properties. This may be e.g. whether the value of the property has improved in comparison with the last determination of the cutting parameters—green upward arrow—or whether the value has worsened in comparison with the last determination of the cutting parameters—red downward arrow.

In the top part of the area 12.3 there is illustrated a graphical representation 20, e.g., a photograph of the laser-cut edge, as it is expected under the determined cutting parameters illustrated in the bottom area of 12.3. Graphical representations 20 of laser-cut edges, which are linked to machine parameters, to process parameters, to material parameters and also to cutting parameters, may be stored in the memory 16 (FIG. 2). In this way, with respect to given parameters, the graphical representation 20 best matching a laser cutting result to be achieved can be read from the memory 16 and output on the graphical user interface 12 to provide information to an operator.

The invention makes it possible to represent the quality of the cut edge objectively, transparently and individually. The setting can be done intuitively. The way in which the properties of the cut edge are linked and the fact that an improvement of a property influences the quality of the other properties is clearly shown to an operator. However, this also clearly shows the limits within which the cutting process can be set by the cutting parameters. The cutting process becomes more predictable.

The following is a summary list of reference numerals and the corresponding structure used in the above description of the invention:
- 10 Apparatus
- 12 Graphical user interface (GUI)
- 12.1 First area of the graphical user interface 12
- 12.2 Second area of the graphical user interface 12
- 12.3 Third area of the graphical user interface 12
- 14 Computing unit
- 16 Memory (MEM)
- 18 Laser cutting machine
- 20 Graphical representation

The invention claimed is:

1. An apparatus for machining a workpiece, the apparatus comprising:
- a graphical user interface configured to receive at least one parameter selected from the group consisting of a machine parameter of a laser cutting machine, a process parameter, and a material parameter; and said graphical user interface being configured to output properties of a laser-cut edge to be cut by the laser cutting machine, with the properties being able to be influenced by cutting parameters of a given cutting process, and to receive a weighting of the properties specifying how important a given property of the laser-cut edge is in relation to other properties, and the weighting being selected by a user via said graphical user interface;
- said graphical user interface being configured to display a graphical representation of a laser-cut edge in response to receiving the weighting of the properties, the graphical representation being:
  - a photograph of a laser-cut edge matching an expected result of the given cutting process with the cutting parameters; or
  - a graphical representation of the laser-cut edge generated with a data aggregation routine, with the at least one parameter and the cutting parameters forming inputs into the data aggregation routine; and
- a computing unit configured to determine the cutting parameters using the at least one parameter and using the weighting of the properties.

* * * * *